Aug. 20, 1940.  W. G. PETERS  2,211,835
FEEDING DEVICE
Filed June 15, 1939  4 Sheets-Sheet 2
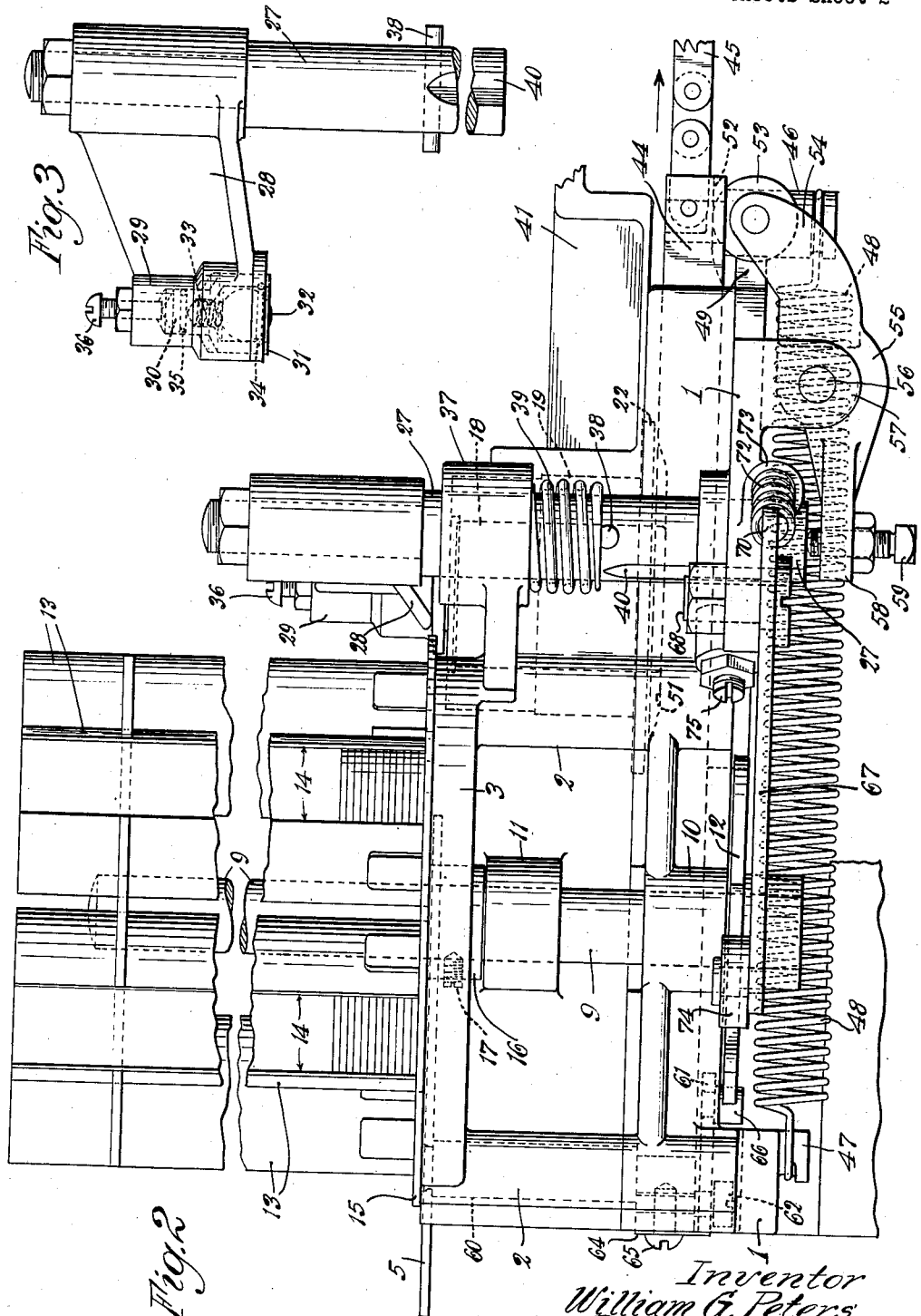
Inventor
William G. Peters
by Parker + Carter
Attorneys

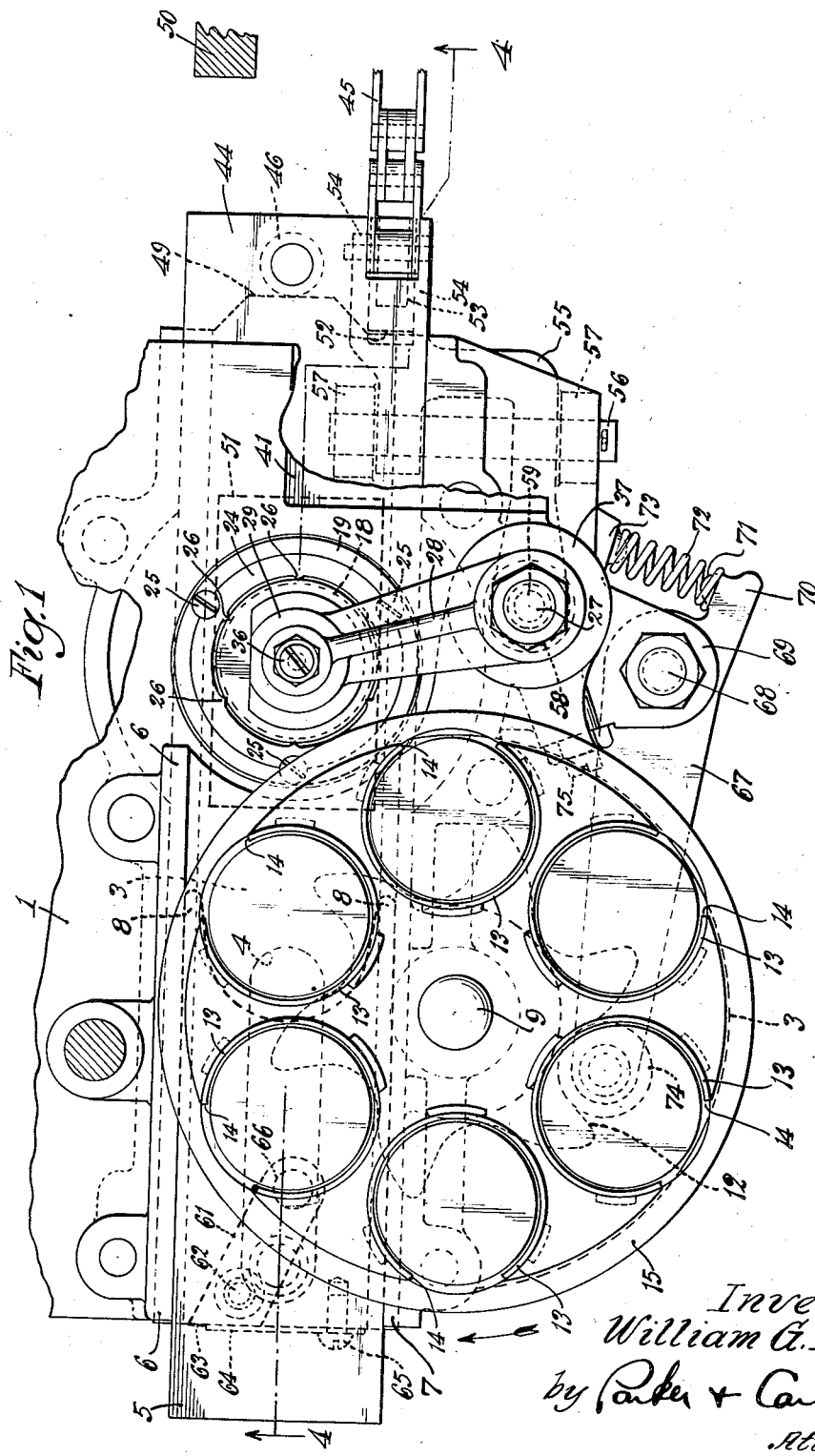

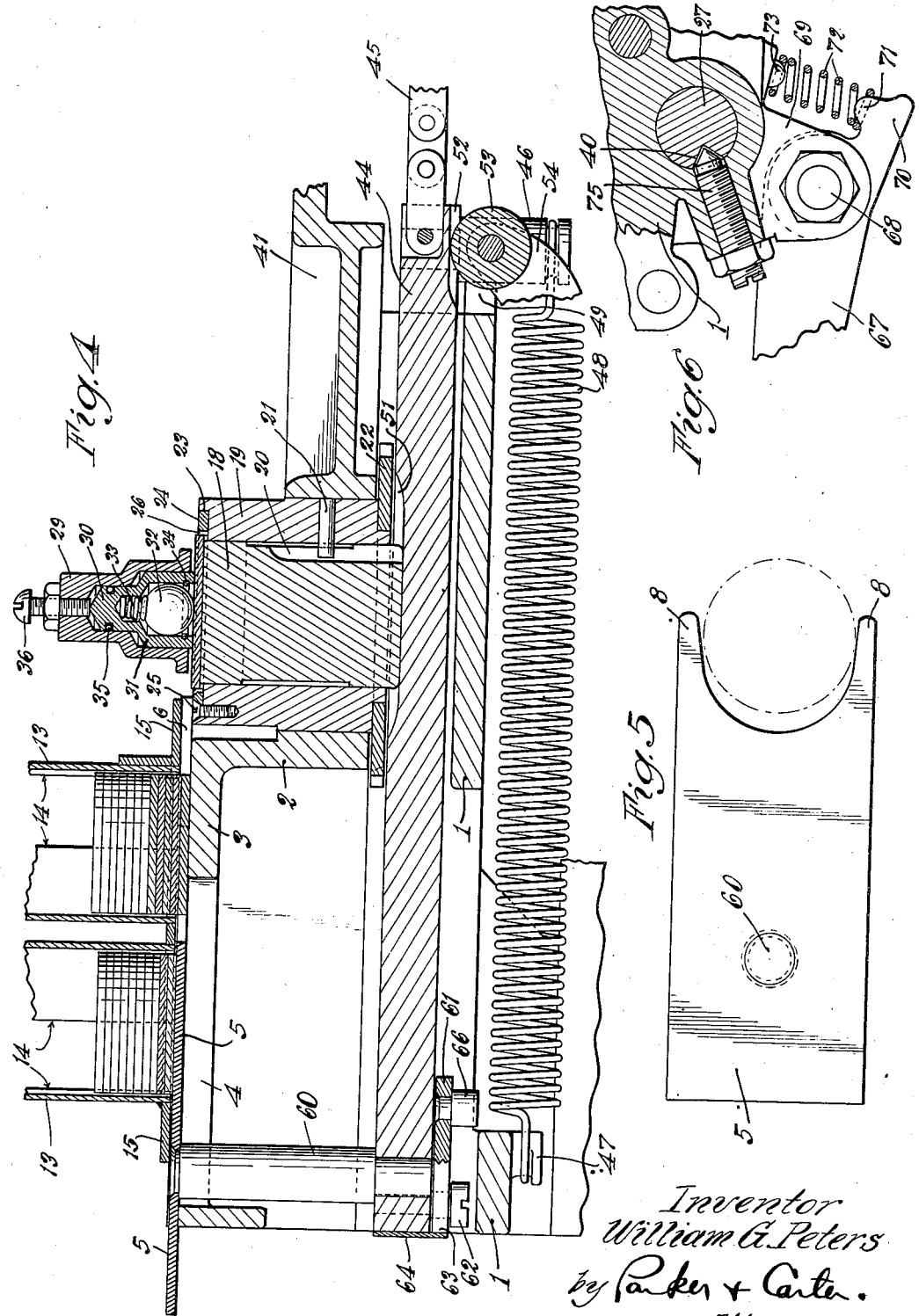

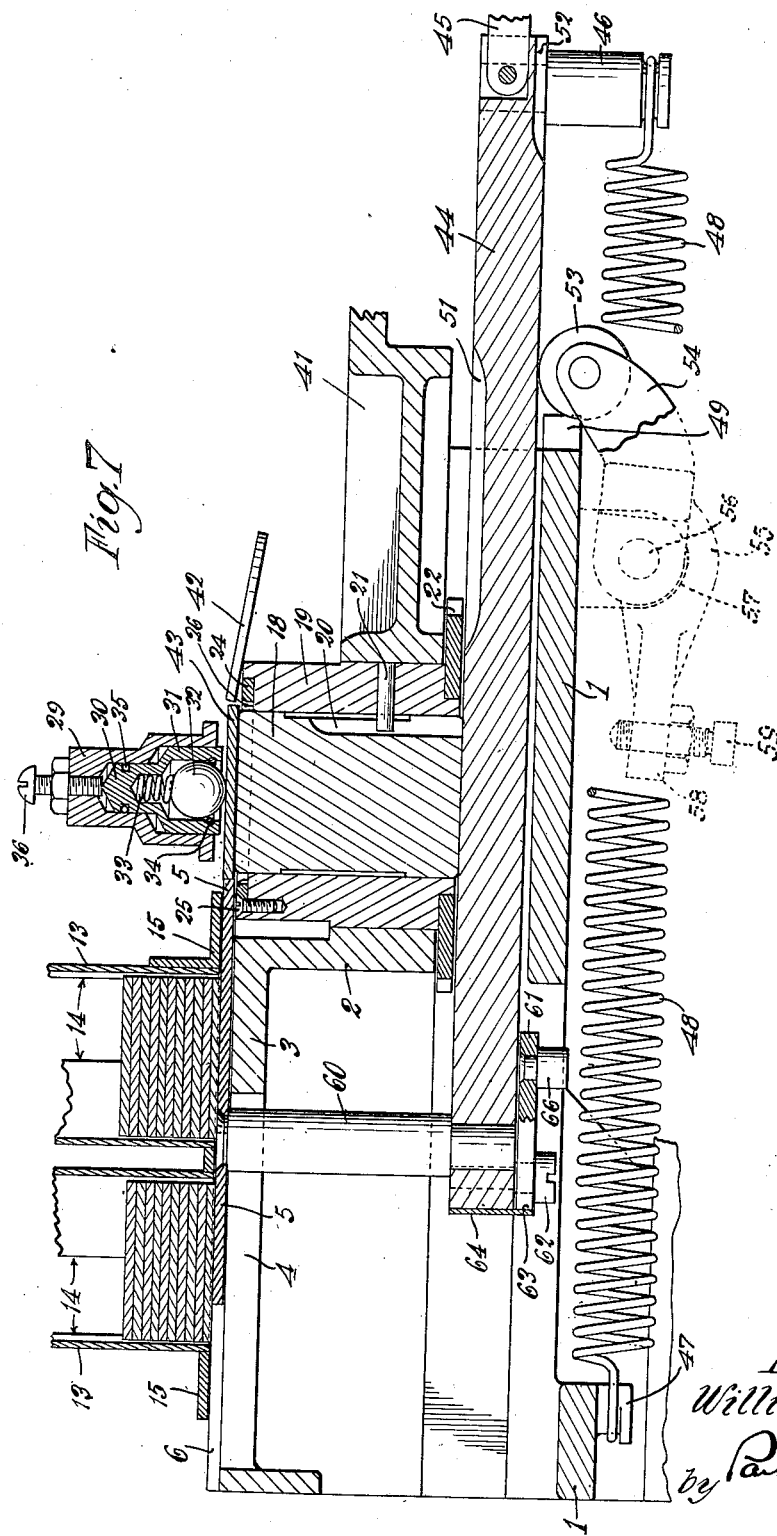

Patented Aug. 20, 1940

2,211,835

UNITED STATES PATENT OFFICE 2,211,835

FEEDING DEVICE

William G. Peters, Oak Park, Ill., assignor to Richard Groetchen, Chicago, Ill.

Application June 15, 1939, Serial No. 279,276

16 Claims. (Cl. 271—10)

This invention relates to means for storing and feeding pieces upon which work is to be done. In the particular form here shown, it comprises a means for storing tokens and for moving or feeding them to a point upon which they are to be marked or otherwise worked upon, and finally for moving them to a point of discharge. One object is, therefore, to provide means for accomplishing these results. Another object is to provide means for storing a plurality of piles of tokens and for successively feeding from the bottom of each pile. Another object is to provide means for moving a token to a point of work for holding it there and for thereafter discharging it therefrom.

Other objects will appear from time to time throughout the specification and the claims.

The invention is illustrated more or less diagrammatically in the accompanying drawings, wherein:

Figure 1 is a horizontal, sectional view with parts in plan, showing the storing and feeding mechanism;

Figure 2 is a side elevation with parts omitted and parts broken away;

Figure 3 is a side elevation of the token-holding means;

Figure 4 is a longitudinal, vertical, sectional view taken at line 4—4 of Figure 1;

Figure 5 is a plan view of the token-engaging means;

Figure 6 is a sectional detail, showing a portion of the operating mechanism;

Figure 7 is a longitudinal, vertical section generally similar to Figure 4 also taken at line 7—7 of Figure 1 and showing the parts in the token-discharge position.

Like parts are designated by like characters throughout the specification and the drawings.

The mechanism shown in the accompanying drawings and the specification describing those drawings show and describe a machine particularly adapted for handling circular tokens. The invention is not limited to such details nor to working upon tokens. It might be applied to a wide variety of other articles and articles of other shapes. The particular means for working upon or marking the token are not shown although in the machine as shown the token when in the work position is partially covered and the means for working upon it would, therefore, be effective upon portions lying close to its edge.

As shown, the various parts of the assembly are mounted upon any regularly shaped frame structure. This includes a base member 1 from which supporting parts 2 extend upwardly to support an upper base member 3. The member 3 is slotted as at 4. A slide 5 is mounted in a guide-way formed as a part of the frame structure and bounded on each side by members 6 and 7. The slide is shown in plan at Figure 6 and is provided with two arms 8 which form, in effect, a forked end suitable for receiving a token as indicated in dotted lines in Figure 5.

9 is a spindle which is supported in suitable members 10 and 11 formed as a part of the frame structure. Adjacent its lower end, the spindle 9 has secured to it a star wheel 12 by means of which it may be rotated. Secured, also, to the spindle is the token magazine or carrier which comprises a plurality of tubular members 13, each provided with an open side or slot 14 and each secured to a base member 15 which carries a hub 16 positioned about the spindle 9 and secured thereto by a set screw 17 or otherwise. The tubular token containers 13 are open at their bottoms and tokens contained in them rest upon the top of the member 3 during the time that they are positioned over the section 3. When one of the tubular containers 13 is positioned over the slide 5, the token in it rests either upon the slide or between the arms 8. In that case, it rests upon the bottom of the guide-way defined by the members 6 and 7.

As one convenient means for holding the token or work piece while it is worked upon, there is provided an anvil 18 which is mounted for reciprocation within a housing 19. A key-way 20 is cut in the anvil 18 and a pin 21 mounted in the housing 19 projects into the key-way and prevents relative rotation of the parts while permitting reciprocation. At its lower end, the housing 19 may carry a gear or sprocket member 22 by means of which it may be rotated. At its upper end, the housing is recessed as at 23 to receive a collar or positioning member 24 which is removably held in position by screws 25 or otherwise. The member 24 may be provided with inwardly directed projections 26 which engage the edges of the token and hold it against rotation with respect to the anvil and the housing 19.

While many different means may be provided for holding the token or work piece in position, the one shown is suitable for many purposes. It comprises a rod 27 mounted for vertical reciprocation in suitable guides. 28 is an arm secured to the member 27 and carrying at its outer end a cup-like, inverted member 29. Within this member is mounted a ball carrier and work-engaging piece 30. As shown, this piece is flared or enlarged as at 31 to engage a ball 32. A spring 33 urges the ball outwardly and a retaining ring 34 prevents displacement of the ball from the member 31. Anti-friction bearings 35 may be positioned, if desired, between the members 29 and 30. A set screw 36 adjustably positions the inner limit of the member 30 and the parts which it carries.

As shown, the member 27 is slidably mounted in a bearing or support 37 which forms a part of the frame structure. A pin 38 may extend through the shaft 37 and a spring 39 is positioned about the shaft bearing at one end upon the support 37 and at the other upon the pin 38. A groove or key-way 40 may be formed in the shaft 27.

Fastened to or formed as a part of the general frame structure is a token chute 41 into which a token falls when work has been completed. As indicated in Figure 7, a token 42 has just been discharged from the anvil and is about to fall into the chute. A second token 43 has just been placed in position on the anvil.

The operating means will now be described. In general, the operating mechanism includes a slide 44 which has several different functions in the operation. As shown in Figures 2 and 4, the slide 44 is in the position of rest. It has secured to it a chain 45. This chain may be pulled or drawn by any desired mechanism and when pulled tends to move the slide in the direction of the arrow of Figure 2. Projecting downwardly from the slide 44 is an abutment member 46. A corresponding abutment member 47 projects downwardly from the portion of the frame member 1 and a spring 48 is secured to the two abutment members. The spring, when free to do so, tends to move and hold the slide in the position of Figure 2, in which position the abutment 46 rests against a stop portion 49 which is secured to or formed as a part of the general frame 1. A stop 50 may be associated with the lever or formed as a part of the general frame structure or secured thereto. It prevents excess movement of the slide in the right-hand or operating direction.

This slide 44 is provided with a cam depression 51 into which the lower end of the anvil 18 fits. When the parts are in the position of rest, as shown in Figure 4, the cam depression 51 is positioned under the anvil 18 and the latter is in the down position. When the parts are as shown in Figure 7, the slide is withdrawn so that the depression 51 is no longer under the anvil 18 and the latter has been forced upwardly into the position for discharging and receiving a token or other work piece.

Elsewhere and in the particular form here shown, below it on or near one end, the slide has a second cam groove 52. A roller 53 is positioned in line with the groove 52 and may enter it. The roller is journaled between ears 54 of a lever 55 which is itself journaled at 56 in members 57 which preferably are formed as a part of the main frame structure. In its opposite end or arm, the lever 55 carries as at 58 an adjusting screw 59 which is positioned to contact the bottom end of the rod 27. Thus, the position of the lever 55 controls the movement and, consequently, the position of the hold-down mechanism associated with the anvil. The groove 51, which controls the movement of the anvil 18, is so related to the groove 52, which controls the movement of the hold-down mechanism, that the two work together in proper relation. When the anvil is raised, as in Figure 7, to discharge a token, the hold-down mechanism is also raised to permit its discharge.

The slide 5 is connected to the operating slide 44 by a pin 60 which lies within the slot 4 in the frame-work and by means of which sliding movement of the operating slide 44 is communicated equally to the token-moving slide 5. Pivoted upon slide 44, preferably on its under surface and adjacent one end, is a lever 61. It is pivoted at 62. It has a flat or squared end 63 bearing against a spring 64 which is removably held in place by a screw or pin 65. The spring tends to lie flat against the end of the slide 44 and, thus, to hold the lever in the position shown in Figure 1 but may yield to permit rotation. At its free end, the lever 61 carries a contact roller 66 adapted to contact the star or driving wheel 12. 67 is a centering lever pivoted as at 68 on an extension 69 formed as a part of the frame. An extension 70 of the lever 67 carries a spring perch 71 against which one end of a spring 72 rests. At its opposite end, the spring is seated upon a second perch or abutment 73 formed on the frame. In its free end, the centering lever 67 carries the centering roller 74 adapted to contact the teeth of the wheel 12. If desired, a set screw 75 may have its inner end positioned loosely within the key-way or groove 40 of the shaft 27. The fit of the two parts is such as to permit reciprocation and prevent rotation of the member 27.

The use and operation of this invention are as follows:

In general, where the mechanism as shown is to be used, it will generally be associated with an operating lever or handle by means of which the chain 45 may be pulled to the right from the position shown in Figures 1 and 2. It is to be assumed that the token carrier has a sufficient number of tokens in it, as shown in Figures 2, 4 and 7 in particular. The mechanism which is to mark or otherwise work upon the token may be of any desired nature. Where a round token is used, the mechanism may involve means for stamping or cutting the exposed portion of the surface of the token. Whatever the exact details of means for moving the chain and for marking or working upon the token may be, it is assumed that a supply of tokens sufficient for the needs of the device is placed in the container. The slide 44 is reciprocated from the position of Figure 4 to that of Figure 7. When this happens, since the cam groove 52 is moved with respect to the roller 53, the latter is depressed and rotates the lever 54 to raise the hold-down mechanism. Also, the groove 51 is moved from under the anvil 18, and the latter is raised to the token-ejecting position. It reciprocates with relation to the housing 19 which encloses it, thus bringing the token above the upper surface of the member 24. The exact relationship between the movement of the anvil and the hold-down mechanism may be varied so long as the hold-down mechanism has been raised sufficiently to reduce the compression upon the token to permit its ejection or discharge. As shown in Figure 4, which is the working position, not only is the ball 32 in contact with the token, but the housing 31 also engages it, thus locking or holding the token rigidly to the anvil and associated parts. As shown in Figure 7, the ball is still in contact with the token but the housing 31 has been raised so that its edges no longer contact the token; the latter may be discharged or a new one pushed in place.

With both the anvil and the hold-down mechanism suitably raised, if the movement of the slide 44 is continued, the roller 66 contacts a tooth of the wheel 12 and moves the entire token-carrying structure, rotating it in a clockwise direction as seen in Figure 1.

Simultaneously, with the movement of the slide 44, the slide 5 also moves. A token from the bottom of the pile next adjacent to the work position is engaged, as indicated in dotted lines in Figures 1 and 5, and as the movement of the slide 5 continues, that token in its movement to the right contacts the token which has previously been on the anvil and pushes it aside, finally assuming its position on the anvil. This is what has just occurred with the parts as shown in Figure 7. A token 42 has just been ejected by a new token 43 which has itself just been pushed into place from the right-hand pile of tokens by the slide 5.

After the discharge of the one token and the placing of a new token on the anvil, the slide 44 is returned by the spring 48. The anvil 18 is lowered as the groove 51 comes into position under it again and, similarly, the hold-down mechanism is lowered as the roller 53 moves into the groove 52. The spring-held centering lever 67 fits into the deepest portion between adjacent teeth of the star wheel and the latter, together with the token-carrying assembly, is held in proper centered position. As the slide 44 returns to its original position, moving to the left it carries with it the slide 5 which finally reaches a position of rest beneath the next adjament pile of tokens from which a token falls between the arms or extensions 8 to rest upon the upper member 3 of the frame in readiness for the next movement of tokens. Also, in its return movement, the lever 61 rides over the end of one of the teeth of the member 12, its squared end 63 depressing or forcing outwardly the spring 64. As soon as the roller 66 has left the tooth, the lever 61 is returned to the position shown in Figure 1 by the spring 64.

In order to make sure that the token is properly held on the anvil, projections 26 may be made in the collar 24. To some degree these may bite into the token but, in any event, they engage it to prevent its turning. Since, ordinarily, more than one operation will be performed upon each token, means will generally be provided for turning the anvil and with it the token. The gear or sprocket 22 may be used for that purpose. The exact details of the turning mechanism have been omitted since they form no essential part of the present invention and for the purpose of this invention the anvil might not be turned or if it is to be turned any suitable turning means may be used, and if one is used, it will preferably be associated with the operating means described herewith so that the turning will occur at the proper time in the total cycle of operation. For instance, the anvil would normally be turned a number of times while the total feeding mechanism is stationary so that several different punchings, markings or other operations might be accomplished on a single token while it remains held to the anvil by the hold-down mechanism and is given only a rotary or other shifting movement suitable to the work which is to be done upon it.

I claim:

1. In combination in a token holding and moving mechanism, a token storage receptacle comprising a plurality of separate storage members, a base, said members being carried by said base, a fixed support, said base positioned to rotate with respect thereto, a slide positioned in said support, means for moving it with respect thereto, means for rotating the token-storing receptacle.

2. In combination in a token holding and moving mechanism, a token storage receptacle comprising a plurality of separate storage members, a base, said members being carried by said base, a fixed support, said base positioned to rotate with respect thereto, a slide positioned in said support, means for reciprocating it with respect thereto, means for rotating the token-storing receptacle.

3. In combination in a token holding and moving mechanism, a token storage receptacle comprising a plurality of separate storage members, a base, said members being carried by said base, a fixed support, said base positioned to rotate with respect thereto, a slide positioned in said support, means for moving it with respect thereto, adapted to deliver it to a token holder comprising an anvil and a hold-down mechanism, and having means for raising and separating them for the introduction of a token between them, and having means for lowering them and for moving them towards each other to grip a token, means for rotating the token-storing receptacle.

4. In combination in a token holding and moving mechanism, a token storage receptacle comprising a plurality of separate storage members, a base, said members being carried by said base, each of said members having an open bottom, a fixed support, said base positioned to rotate with respect thereto, said support forming a bottom for said receptacles when the latter are over it, a slide positioned in said support, means for moving it with respect thereto, means for rotating the token-storing receptacle.

5. In combination in a token holding and moving mechanism, a token storage receptacle comprising a plurality of separate, tubular storage members, each having an open, exposed side, a base, said members being carried by said base, each of said members having an open bottom, a fixed support, said base positioned to rotate with respect thereto, said support forming a bottom for said receptacles when the latter are over it, a slide positioned in said support, means for reciprocating it with respect thereto, said slide having a forked end of substantially the same width as said receptacles, and being adapted to deliver a token to a token holder comprising an anvil and a hold-down mechanism, means for rotating the token-storing receptacle.

6. In a token holding and moving means, a support, a fixed slide-way, a slide movably mounted in said slide-way, a token reservoir rotatably mounted on said base, said reservoir comprising a plurality of containers, the bottom of each container being open, means for rotating said containers in unison to bring them successively over said slide, and means for moving said slide to move a token from one of the containers away from its container toward a work position.

7. In a token holding and moving means, a support having an extended plane upper surface and a fixed depressed slide-way, a slide movably mounted in said slide-way, a token reservoir rotatably mounted on said base, said reservoir comprising a plurality of containers, the bottom of each container being open, means for rotating said containers in unison to bring them successively over said slide, and means for moving said slide to move a token from one of the containers away from its container toward a work position.

8. In a token holding and moving means, a fixed support having an extended plane upper surface and a fixed depressed slide-way, a slide movably mounted in said slide-way, the upper surface of said slide and the said plane surface lying in substantially the same level, a token reservoir rotatably mounted on said base, said reservoir comprising a plurality of containers, the bottom of each container being open, means for rotating said containers in unison to bring them successively over said slide, and means for moving said slide to move a token from one of the containers away from its container toward a work position.

9. In a token holding and moving means, a support, a fixed slide-way, a slide movably mounted in said slide-way, a token reservoir rotatably mounted on said base, said reservoir comprising a perforated bottom and a plurality of containers secured thereto, the bottom of each container being open, means for rotating said containers in unison to bring them successively over said slide, and means for moving said slide to move a token from one of the containers away from its container toward a work position.

10. In a token holding and moving means, a support, a fixed slide-way, a slide movably mounted in said slide-way, a token reservoir rotatably mounted on said base, said reservoir comprising a perforated bottom and a plurality of containers secured thereto, the bottom of each container being open and in register with a perforation in said bottom, means for rotating said containers in unison to bring them successively over said slide, and means for moving said slide to move a token from one of the containers away from its container toward a work position.

11. In a token holding and moving means, a support having an extended plane upper surface and a fixed depressed slide-way, a slide movably mounted in said slide-way, the upper surface of said slide and the said plane surface lying in substantially the same level, a token reservoir rotatably mounted on said base, said reservoir comprising a plurality of containers, the bottom of each container being open and in register with a perforation in said bottom, means for rotating said containers in unison to bring them successively over said slide, and means for moving said slide to move a token from one of the containers away from its container toward a work position.

12. In a token holding and moving means, a fixed support having an extended plane upper surface and a fixed depressed slide-way, a slide movably mounted in said slide-way, the upper surface of said slide and the said plane surface lying in substantially the same level, a token reservoir rotatably mounted on said base, said reservoir comprising a perforated bottom and a plurality of containers secured thereto, the bottom of each container being open and in register with a perforation in said bottom, means for rotating said containers in unison to bring them successively over said slide, the tokens within said containers lying on said plane surface and said slide, and means for moving said slide to move a token from one of the containers away from its container toward a work position.

13. In combination in a token storing and handling means, a token reservoir comprising a plurality of tubular members having open bottoms, a movable support therefor perforated in register with the bottom openings, a fixed base, a slide supported by said base and means for reciprocating it, a linkage from said slide-way to said movable support whereby reciprocation of the slide is effective to rotate the base, a token-holding assembly positioned to receive tokens, and means for holding said slide yieldably against reciprocation.

14. In combination in a token storing and handling means, a token reservoir comprising a plurality of tubular members having open bottoms, a movable support therefor perforated in register with the bottom openings, a fixed base, a slide supported by said base and means for reciprocating it, a linkage from said slide-way to said movable support whereby reciprocation of the slide is effective to rotate the base, a token-holding assembly positioned to receive tokens, and means for holding said slide yieldably against reciprocation, and an auxiliary slide, connected to said first mentioned slide and adapted, when reciprocated, to move a token from one of said containers to a position upon said anvil and below said hold-down mechanism.

15. In combination in a token storing and handling means, a token reservoir comprising a plurality of tubular members having open bottoms, a movable support therefor perforated in register with the bottom openings, a fixed base, a slide-way in said base, a slide supported by said vase and means for reciprocating it, a linkage from said slide-way to said movable support whereby reciprocation of the slide is effective to rotate the base, a token-holding assembly positioned to receive tokens from said slide-way and comprising an anvil and a hold-down member, connections between said parts and said slide effective to separate the anvil and the hold-down mechanism upon reciprocation of the slide, and means for holding said slide yieldably against reciprocation, and an auxiliary slide mounted in said slide-way.

16. In combination in a token storing and handling means, a token reservoir comprising a plurality of tubular members having open bottoms, a movable support therefor perforated in register with the bottom openings, a fixed base, a slide-way in said base, a slide supported by said base and means for reciprocating it, a linkage from said slide-way to said movable support whereby reciprocation of the slide is effective to rotate the base, a token-holding assembly positioned to receive tokens from said slide-way and comprising an anvil and a hold-down member, connections between said parts and said slide effective to separate the anvil and the hold-down mechanism upon reciprocation of the slide, and means for holding said slide yieldably against reciprocation, and an auxiliary slide mounted in said slide-way, rigidly connected to said first mentioned slide and adapted, when reciprocated, to move a token from one of said containers to a position upon said anvil and below said hold-down mechanism.

WILLIAM G. PETERS.